(12) United States Patent
O'Shea

(10) Patent No.: US 8,423,284 B2
(45) Date of Patent: Apr. 16, 2013

(54) MONITORING, RECORDING AND TESTING OF NAVIGATION SYSTEMS

(75) Inventor: Michael O'Shea, Rancho Palos Verdes, CA (US)

(73) Assignee: Abalta Technologies, Inc., Torrance, CA (US)

( * ) Notice: Subject to any disclaimer, the term of this patent is extended or adjusted under 35 U.S.C. 154(b) by 330 days.

(21) Appl. No.: 12/761,323

(22) Filed: Apr. 15, 2010

(65) Prior Publication Data

US 2010/0268459 A1 Oct. 21, 2010

Related U.S. Application Data

(60) Provisional application No. 61/212,852, filed on Apr. 15, 2009.

(51) Int. Cl.
*G01C 21/00* (2006.01)

(52) U.S. Cl.
USPC ............................. 701/400; 73/178 R; 73/865.9

(58) Field of Classification Search .................. 701/400; 73/1.01, 1.78, 178 R, 865.9; 700/90, 302, 700/304, 306; 702/108, 113, 115, 116; 703/19; 346/7, 20, 33 TP
See application file for complete search history.

(56) References Cited

U.S. PATENT DOCUMENTS 5,922,041 A * 7/1999 Anderson ...................... 701/468
7,302,371 B2 * 11/2007 Oesterling et al. ................. 703/7

\* cited by examiner

*Primary Examiner* — Mark Beauchaine
(74) *Attorney, Agent, or Firm* — Excelsior Patent Group; Bruce A. Hare

(57) ABSTRACT

A testing system is described. The testing system is adapted to evaluate navigation systems. The testing system includes: a recording system adapted to collect and record signals received and interpreted by a navigation system during field operation; a time-synchronized database adapted to receive and store data representing the signals collected and recorded by the recording system: wherein the stored data is able to be used to test operation of one or more navigation systems under test. A method of testing navigation systems includes: gathering data that would be received and interpreted by a navigation system during field operation, wherein the gathered data includes data associated with received radio signals; storing gathered data in a time-synchronized database; and using the stored data to test the operation of one or more navigation systems. A system adapted to test navigation systems includes: a recording system; a playback system; and a simulation system.

20 Claims, 5 Drawing Sheets

MONITORING, RECORDING AND TESTING OF NAVIGATION SYSTEMS

This application claims the benefits of the priority of Provisional Patent Application No. 60/212,852, which was filed Apr. 15, 2009. This provisional application is fully incorporated by reference, as if fully set forth herein. All other publications and U.S. patent applications disclosed herein below are also incorporated by reference, as if fully set forth herein.

BACKGROUND OF THE INVENTION

1.. Field of the Invention

The present invention relates to system testing and, more particularly, to navigation systems testing.

2.. Description of Related Art

Preinstalled vehicle navigation systems are optionally available on nearly all private vehicles sold in developed countries, and increasingly, in developing countries. Portable navigation devices, or PNDs, are becoming ubiquitous across the world due to their low cost and convenience. Worldwide commercial vehicle fleets are beginning to use navigation software and systems to enhance efficiency. On mobile phones too, navigation applications, or Location Based Services (LBS) applications, are emerging and are expected to become prevalent in the future. These "Navigation Systems" will continue to find wide applicability across a host of industries, device platforms and use cases.

Navigation Systems provide functionality that is very helpful in assisting the user in navigating along public roadways or walkways to a desired location. For example, vehicle Navigation Systems are capable of instructing a driver as to the location of the driven vehicle; providing turn-by-turn driving instructions to a destination optimized for time, distance, or other factors; displaying maps at any desired scale; and other such features. Similarly pedestrian oriented Navigation Systems can be used to orient a user traveling in an unknown area by providing visual maps with an indication of the user's current locations, to provide the user with suitable instructions for traveling by foot or public transportation to their desired destination etc. Other uses of these systems include enabling a user to search for places, services or items of interest in his/her vicinity, displaying current traffic or weather information for a selected region, searching for location-relevant information on the Internet, locating friends in the vicinity of the user, providing location relevant advertising to the user, etc. Specific functionality can also be provided for particular business or enterprise applications.

Navigation Systems often receive information and data from a variety of sources including Global Navigation Satellite Systems (GNSS) such as the Global Positioning System (GPS), inertial sensors such as gyroscopes, various signals obtained from the vehicle such as speed signals, terrestrial analogue or digital radio signals and data from satellite broadcasts. Navigation Systems typically include hardware and software for handling and interpreting such information to provide the operator with desired functionality. The ability of Navigation System software and hardware to correctly handle and interpret information in an accurate and efficient manner increases the functionality, performance, and value of a Navigation System.

Current methodologies for testing Navigation Systems are costly, time-consuming, and cumbersome. Typically, testing involves both bench and field testing. Bench testing is used as much as possible to achieve the broadest and most efficient test coverage. Field testing is used to assess system elements which must be evaluated in the precise way that consumers use such systems—on the road. Much of the focus of field testing is on validating vehicle positioning, guidance prompt protocols and dynamic services such as real time traffic information. Field testing of vehicle Navigation Systems includes securing a Navigation System to a vehicle and monitoring the behavior of the system as the vehicle is driven in the field, i.e., along public roadways and thoroughfares where consumers are expected to use such a Navigation System. Such field-testing often includes monitoring the Navigation System during general operations such as the provisioning of guidance instructions, the determination of the vehicle's actual position and the provisioning of current traffic condition information. The Navigation System must be taken to many disparate locations and driven in the field to conduct sufficient national or international testing. In addition, once errors are uncovered, the errors must be corrected and the Navigation System may have to be returned to the location where the error was originally found to confirm that the correction yielded proper results. Similarly, pedestrian Navigation Systems are tested in the field by walking with the system as a pedestrian would and observing the behavior of the system. As will be appreciated, current testing protocols often require substantial time and financial resources to properly test a Navigation System and to prepare the system for release in the marketplace.

There is a need for systems and methods for expediting the testing of Navigation Systems to decrease the expense of testing and shorten the time to develop and market such Navigation Systems.

SUMMARY OF THE INVENTION

The present invention is a system and a method for testing of navigation systems. The testing system may include a recording system that allows capturing environmental related signals (e.g., radio frequency signals) and/or motion related signals (e.g., inertia signals from a vehicle) on the field. The recorded data can be then played back in laboratory environment using a playback system to test one or more devices under test. The testing system may also include a simulation system that allows generating and conveying signals to the devices under test.

To this end, in an exemplary embodiment of the present invention is a testing system for navigation systems, comprising a recording system gathering information in the field that would be experienced and relied by a navigation system during field operation (i.e., field information that would be actually experienced by a navigation system during field operation), and storing the information into a database synchronized in time, wherein the stored information is used to test operation of navigation systems including a device under test, wherein the recording system comprises an environmental signal recording subsystem that gathers signals related to environment that would be experienced and relied by a navigation system during field operation, and stores the environmental signal into the database synchronized in time. The testing system may further comprise a motion signal recording subsystem that gathers signals related to motion that would be experienced and relied by a navigation system during field operation, and stores the motion signal in the database synchronized in time. The testing system may further include a playback system, which includes at least an environmental signal playback subsystem, and may further include a motion signal playback subsystem. The environmental signals include radio frequency signals. The motion signals include inertia signals (e.g., from inertia sensors, including accelerometers, gyroscopic sensors, etc., as those that may be installed in vehicles).

In an exemplary embodiment the recording system may be recording Global Navigation Satellite Systems (GNSS) signals such as GPS.

In an exemplary embodiment the recording system may be recording vehicle sensor signals such as speed pulse, differential wheel speed sensor signals, etc.

In an exemplary embodiment the recording system may be recording video signals from multiple angles.

In an exemplary embodiment the recording system may be recording radio signals such as RDS-TMC, Sirius Satellite Radio, etc.

In an exemplary embodiment the recording system may be recording WiFi, cellsite and other such information used for positioning purposes.

In an exemplary embodiment the playback system may be broadcasting to one or more devices under test prerecorded radio signals via one or more antennas.

In an exemplary embodiment the playback system may be conveying the prerecorded signals to one or more devices via cable connection.

In an exemplary embodiment the playback system may be playing back prerecorded turn information through a motion rate table to subject a device under test to real-world-like conditions.

In an exemplary embodiment the playback system may be conveying to one or more devices under tests additional vehicle signals such as speed pulse, acceleration, parking break position, etc.

In an exemplary embodiment the playback system may be playing back one or more video signals captured in the field and synchronized with the other played back signals.

In an exemplary embodiment the simulation system may be generating and broadcasting to one or more devices under test GNSS signals.

In an exemplary embodiment the simulation system may be generating and conveying to one or more devices under tests motion signals.

In an exemplary embodiment the simulation system may be generating and conveying to one or more devices under tests additional vehicle signals such as speed pulse, parking break position, reverse signal, etc.

In an exemplary embodiment the simulation system may be generating and broadcasting to one or more devices under test traffic information via radio signals such as RDS-TMC, XM, HD Radio, etc.

DESCRIPTION OF THE ILLUSTRATED EMBODIMENTS

Figure 1:
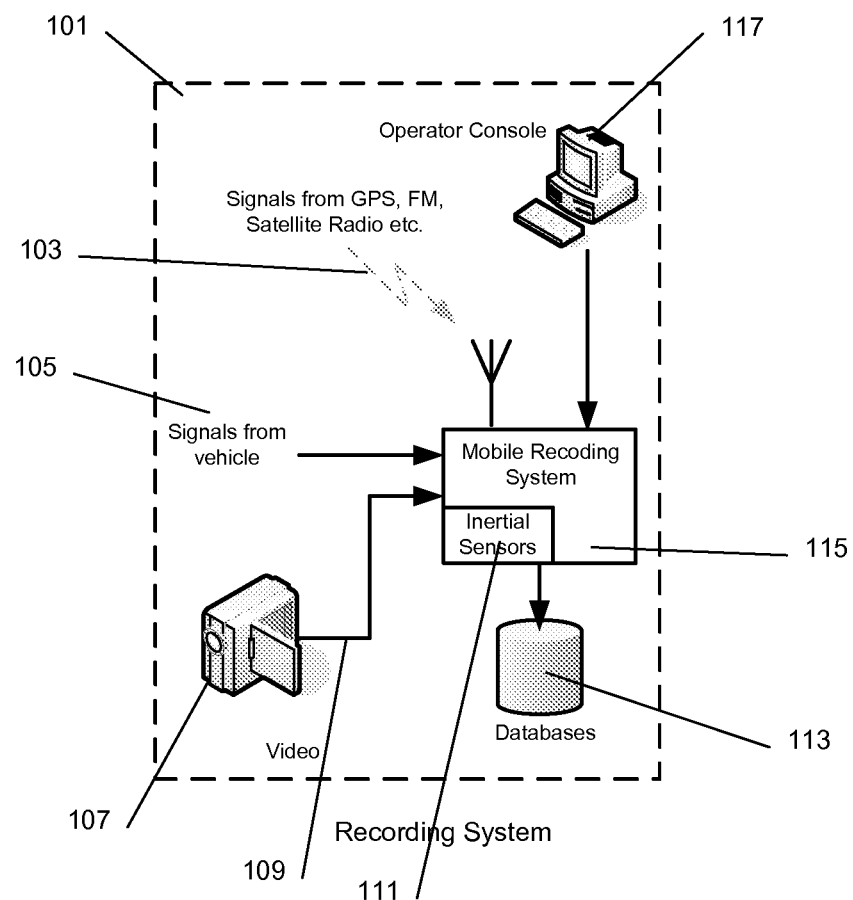
FIG. 1 illustrates a schematic diagram of the recording system in an exemplary embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

While the description below refers to various devices, systems and subsystems, it is understood to one skilled in the art that various devices, systems and subsystems may be embodied in separate or combined physical unit, and may have separate physical components or share physical components, while providing the functionality and features of the respective devices, systems and subsystems, without departing from the scope and spirit of the present invention. For example, in the description below, the environmental signal recording subsystem and the motion signal recording subsystem may be embodied in the same physical unit or separate physical units, with certain shared electronic components. Further, the environmental signal playback subsystem and the motion signal playback subsystem may be embodied in the same physical unit or separate physical units, with certain shared electronic components. Still further, the recording system and the playback system may be embodied in the same physical unit or separate physical units, with certain shared electronic components.

The present invention is a system and a method to reduce cost, complexity and the time it takes to field test a Navigation System. It is a revolutionary advancement in the state of the art of testing Navigation Systems. It provides a quantum leap in test optimization, enabling far greater coverage of functional testing in critical location scenarios. The net result of using this system will be better navigation products coming to market without substantially larger investments in testing efforts.

The present invention enables, for the first time, substantial laboratory testing of the most complex, demanding, and resource-intense testing tasks faced by makers of Navigation Systems-Vehicle Positioning, Guidance and the usage of Real Time Traffic information. It also will greatly facilitate laboratory testing of other functions like Map Display and Route Calculation.

This system makes it possible to conduct extensive real-world testing of Navigation Systems of far greater breadth and depth of conditions and locations, in the test laboratory environment, rather than on the road. This not only allows much greater effectiveness and efficiency of initial testing, it also enables a rapid retest capability when a problem has been found and fixed. For example, testers could check the revised handling of the "Arch de Triomphe" roundabout without having to actually go to Paris.

The system is comprised of two major components—a Recording System (RS) and a Playback and Simulation System (PSS). The Recording System comprises an environmental signal recording subsystem, and may further comprise a motion signal recording subsystem. The Playback and Simulation System comprises an environmental signal playback subsystem that provides stored environmental signals to the device under test synchronized in time, and may further comprise a motion signal playback subsystem that provides stored motion signals to the device under test synchronized in time. The environmental signals include radio frequency signals, such as satellite signals, temperature, geo-magnetic signals, etc. The motion signals include inertia signals from inertia sensors, including signals obtained from accelerometers, gyroscopes, etc. that relate to motions of a navigation system, or motions of the supporting platform or vehicle in which the navigation system is installed, during field operation.

Figure 2:
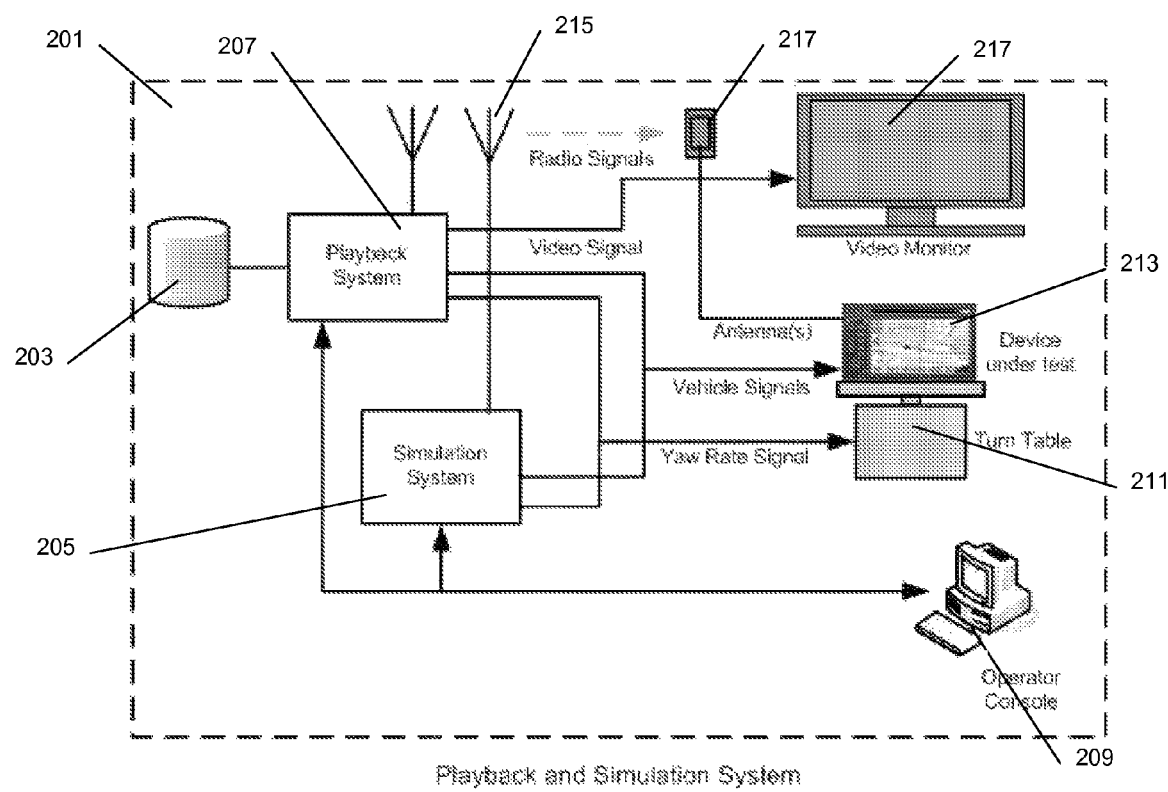
FIG. 2 illustrates a schematic diagram of the playback and simulation system in an exemplary embodiment of the present invention.

In FIG. 1 a high level architecture of the Recording System is shown. The recording system 101 is a system and method for collecting and recording an array of sensor signals (105, 111), radio signals (103), and visual input (109) that, in the aggregate, provide a real-world model of the ambient experience of driving along a portion of the road network, walking along a particular stretch of pathway, navigating along a particular stretch of waterway, or navigating in a particular air space. It is comprised of a Mobile Recording System ("MRS") 115 which digitizes and records radio signals such as GPS, FM Radio and Satellite Radio (103). Signals are collected and recorded by the Recording System while in motion in the field in real world environment, for example, along a portion of the road network, along a particular stretch of pathway, along a particular stretch of waterway, or in a particular airspace. If the recording is conducted in a vehicle, the MRS can also record signals that it obtains from the vehicle. The MRS incorporates inertial sensors (111), such as a gyroscope, which measures the motion of the MRS and produces corresponding electrical signals. A gyroscope for example, measures the angular acceleration, or yaw rate of the MRS during the recording. The MRS digitizes and records these signals. Additionally, the MRS records video information from a camera (107). The MRS is, by necessity, installed in a moving vehicle or a portable version can be carried by a pedestrian. All recording processes are executed in parallel. Collected data is marked with location tags and time stamps as it is recorded in one or more databases (113). This enables the compiling of the collected data records to be utilized for time- and location-synchronized replay by the Playback and Simulation System 201 that is shown in FIG. 2. In one embodiment of the invention, the collected data might be stored as individual files in a file system. In another embodiment, the data might be recorded in Database Management Systems (DBMS) such as Relational Database Management System (RDMS) or Object-Relational Database Management System (ORDMS). In yet another embodiment it could be stored in a combination of file system and DBMS.

The Playback and Simulation System (201) is a system and method for subjecting a Navigation System under test (213) to a sequence of test cases. Depending on variable test configurations, this Device Under Test ("DUT") can be subjected to recreated real-world conditions utilizing the signals, data and images collected by the Recording System (101) or subjected to similar simulated real-world conditions (generated by the Simulation Sub-system (205). It is also feasible to utilize a combination of recreated and simulated conditions. This enables a far greater breadth and depth of Navigation Systems testing to be accomplished in the laboratory environment than has been heretofore possible.

The Radio Frequency (RF) signals needed for a test typically consists of a GNSS broadcast signals and possibly other signals such as FM/RDS, XM, DAB, etc. This information is recorded by the Recording System (101) or can be generated by the Simulation System (205), which is a subsystem of the Playback and Simulation System (201). A given time- and location-specific scenario is applicable to each test case to be executed. The RF signals associated with the scenario are rebroadcast or otherwise conveyed to the DUT, via a coaxial cable or similar, by the Playback or Simulation System, such that the DUT experiences the signals (through its antennas 215 and receivers 217) as if it were traveling through the designated location at the designated time.

Synchronized motion information is stored in associated in time- and location specific data records by the Recording System (101). This information can be comprised of speed, linear, and angular acceleration values. The speed information is used to recreate the real-world conditions inputs for the Navigation System's Vehicle Speed Sensor (VSS) or CAN bus interface (if it is so equipped). The angular acceleration information can be used to drive a motion control rate table (211). This allows the navigation systems' gyroscope (or other angular acceleration sensor), if it is so equipped, to be subjected to the same motion it would have experienced in the real world at the time the recording was made. The Simulation System is capable of simulating speed and angular acceleration information, which can be used to subject the DUT (213) to real-world-like conditions. Other signals such as vehicle parking brake state, vehicle reserve state, and steering wheel position can also be recorded. These signals can later be recreated from the recorded values and provided to the DUT.

The Playback System (201) is ideal for subjecting the DUT (213) to nearly identical conditions as it would experience in the real world. These conditions include undesirable effects such as multipath or signal fading of RF signals for example, or the effects of certain vehicle motion dynamics, missing speed values, problems with angular acceleration values due to mounting or vehicle vibration issues etc. A system tested under these conditions can be reliably certified for use in the environments where these conditions arise. For some test cases, it is preferable to simulate real-world conditions rather than to recreate them from captured and recorded signals and data. This simulation approach to GPS broadcasting is particularly useful in testing certain conditions that a Navigation System's sensor processing module may encounter in the real-world. Conditions such as driving off-road and driving the wrong way on a highway are difficult, or impossible, to capture and record for playback. However, these conditions can be created easily with the GPS simulation equipment. Similarly a full range of real time traffic conditions can be simulated and broadcast to the DUT.

Figure 3:
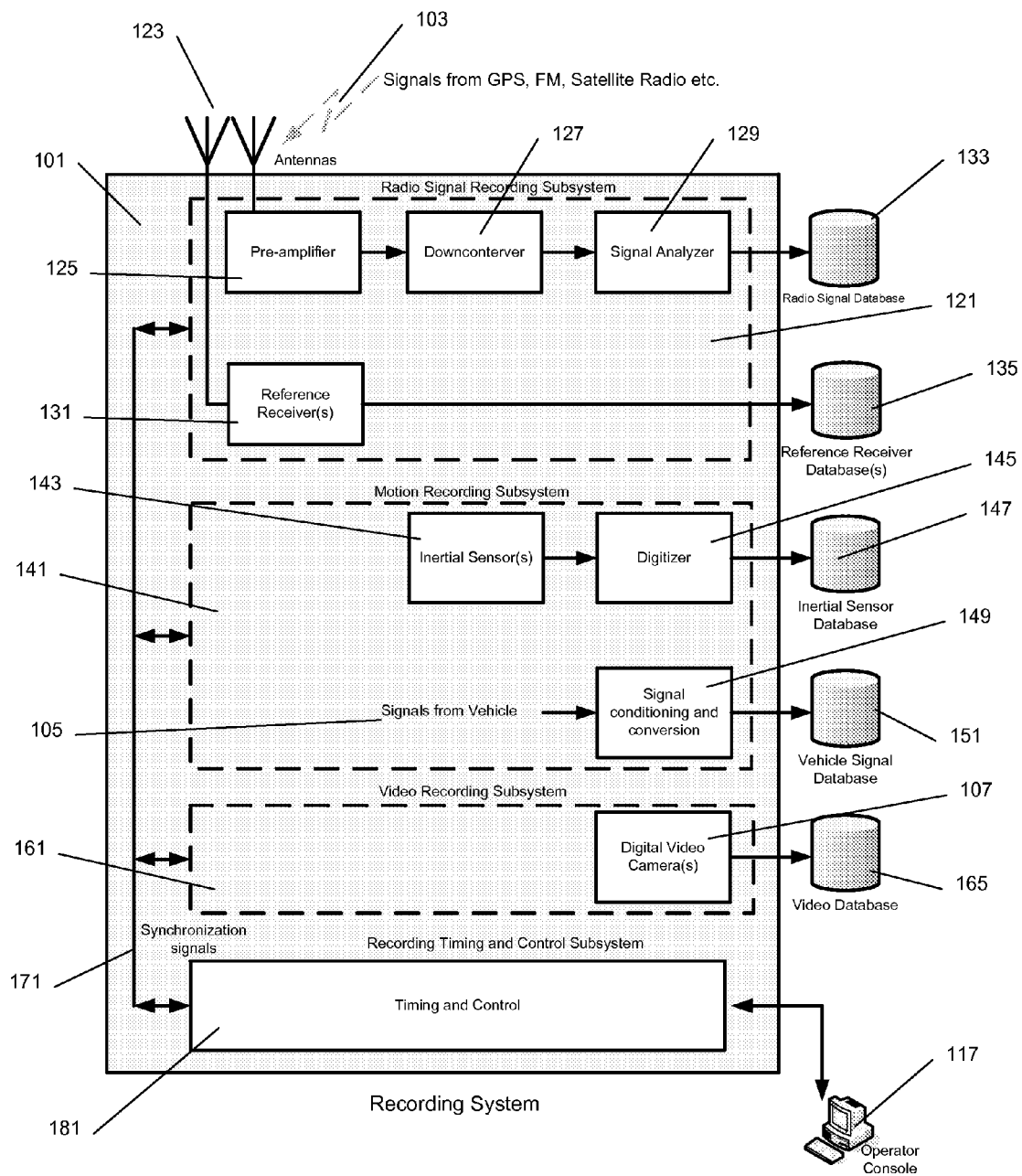
FIG. 3 illustrates a schematic diagram of the recording system in an exemplary embodiment of the present invention.

FIG. 3 shows an exemplarity embodiment of the Recording System. It consists of subsystems responsible for capturing an array of signal and information sources. The Radio Frequency (RF) signals recorded by the Recording System include, but are not limited to: Global Navigation Satellite Systems (GNSS) signals such as the Global Positioning System (GPS), the Galileo system, the GLObal'naya NAvigatsionnaya Sputnikovaya Sistema (GLONASS) system and the Beidou Navigation System (Compass); GPS Augmentation signals such as the Wide Area Augmentation System (WAAS), cellular phone assisted GPS etc; FM radio broadcasts, including FM sub-carrier signals, e.g. Radio Data Signals (RDS); Satellite digital radio broadcasts (such XM, Sirius and DAB); Terrestrial digital radio broadcasts such as HD Radio.

The Motion Information sensor signals captured by the Recording System include, but are not limited to: Speed (which can be derived from vehicle VSS or CAN bus signals or other sources); Angular acceleration (derived from a Gyroscope); Linear acceleration (derived from an accelerometer); Other signals such as vehicle parking brake state, vehicle reverse state, steering wheel angle, etc.

In an exemplary embodiment, the Recording System can record synchronized digital video Information from one or more video sources.

Referring back to FIG. 3, in an exemplary embodiment of the Recording System (101), the RF signals (103) are recorded by the Radio Signal Recording Subsystem (121). The system is configure by software as to which frequency range(s) of RF spectrum to capture, at what sampling rate, power level and other parameters. RF signal recording can be set to capture RF broadcast signals from GNSS, GNSS augmentation signals, FM/FM sub-carrier (RDS), satellite digital audio and other radio signal sources.

The Radio Signal Recording Subsystem captures the targeted RF signals through frequency-range-specific antennas (123). The signals are often weak and must be amplified before they are processed further. In one embodiment of the invention, this is accomplished by the use of a preamplifier (125), such as the National Instruments NI PXI-5690 3 GHz Preamplifier. The signal may also be filtered at this stage to remove signals which are outside the frequency range of interest. The amplified signal is then passed to a downconverter (127). This shifts the carrier frequency of the modulated radio signal to a more manageable frequency, while preserving the information in the modulated signal. The signal power-in-band is calculated and stored and the signal is then digitized and recorded using a signal analyzer (129). In an exemplary embodiment, a NI PXI-5661 instrument from National Instruments, which combines downconverter and a vector signal analyzer components, is used. This device incorporates a method for rapid streaming of the digital samples to hard disk for long-term storage. Depending upon the hardware used, the acquired waveform samples represent the amplitude (Real data), or a Cartesian combination of phase and amplitude (commonly known as I/Q data). This data is buffered in on-board RAM before being stored for later retrieval in a database (133), which may be located on a hard disk. It is also possible to convert from I/Q to Real data to reduce storage needs and subsequently reconvert back to I/Q for playback.

In an exemplary embodiment, in addition to recording the RF broadcast signals directly, the radio signal recording subsystem (121) also records the outputs of reference radio receivers (131) designed to capture these RF broadcasts. For example, if a GPS RF signal is recorded, the system will also capture the output of a GPS reference receiver. This output is typically a NMEA data stream, although other data formats are also used. This information will be primarily used for calibration of the playback signal by the Simulation and Playback System (201). In an exemplary embodiment this data is used to provide the time stamp and location identifiers for tagging all related data for later compilation into a synchronized playback. In another embodiment it can be used during signal playback to indicate where the recording took place.

In an exemplary embodiment, the Motion Recording Subsystem (141) incorporates high quality motion sensors (143). In one exemplary embodiment the recording system utilizes several gyroscopes or accelerometers, such that angular and linear acceleration can be recorded in multiple planes of motion. The signals from those sensors a further digitized (if required) by the Digitizer (145) and the time synchronized data is recorded in the inertial sensor database 147. In one exemplary embodiment a sensor such as a Fizoptika VG035P Fiber-Optic Rotation Sensor is used. This produces signals that correspond to the yaw rate of the Recording System. In an exemplary embodiment the Motion Recording Subsystem samples and digitizes the signal produced by these sensors using an analogue to digital converter such as the 18-Bit, 500 KS/s NI PXI-6280 Digital Acquisition instrument (DAQ) provided by the National Instruments.

Referring back to FIG. 3 in an exemplary embodiment a Motion Recording Subsystem (141) can also be used to record various signals (105) obtained from a vehicle, for example speed information, vehicle parking brake status, vehicle reverse status, steering wheel angle and the like. In one embodiment, the speed information is obtained from the VSS signal, readily available on most cars. In another embodiment the speed information is obtained from the vehicle CAN bus if the vehicle is so equipped. It is sometimes necessary to adjust the voltage levels of these signals or otherwise isolate them from the vehicle electronics, which can exhibit electrical characteristics that can be damaging to the sensitive measuring instruments in the Motion Recording Subsystem (141). This is done inside component 149 shown on FIG. 3. These conditioned signals are then passed to a suitable DAQ (149). In an exemplary embodiment National Instruments 18-Bit, 500 KS/s NI PXI-6280 DAQ is used, which has multiple input channels and can accommodate the recording of multiple signals simultaneously.

The motion signals are recorded in a database 151 with synchronizing time stamp and location identifiers so that it can be played back to a DUT in synchronization with other signals and data captured in the same space and time.

Referring to FIG. 3, in an exemplary embodiment the Recording System (101) can have a Video Recording Subsystem (161) that utilizes one or more digital video cameras (107) to capture the view of the environment as the Recording System traveled through the locations in which the signal data is captured. In the case where the Recording System is carried in a vehicle for example, the video can be used to capture the view of the roadway seen by the occupants of the vehicle as the signal data was captured. The videos images captured in this manner are recorded in a database (165) with synchronizing time stamp and location identifiers so that it can be replayed for synchronized observation by a test technician while laboratory testing a DUT that is processing the other signals and data captured in the same space and time.

In an exemplary embodiment of the Recording System it could contain a Recording Timing and Control Subsystem 181 that is responsible for communicating with the external operator console (117), which is used by the operator to control the system. User settings and controls are conveyed by the timing and control subsystem to the respective subsystem. The Recording Timing and Control Subsystem also controls the synchronization (171) of the recording by the individual recording subsystems so all of the recorded signals can be played back to a DUT in the same space and time.

The Playback and Simulation System (201) is a system and method for subjecting a DUT to recreated real-world conditions utilizing the signals, data and images collected by the Recording System (101) or subjected to simulated real-world conditions of the same sort. In one exemplary embodiment a combination of recreated and simulated conditions is utilized. This enables a far greater breadth and depth of Navigation Systems testing to be accomplished in the laboratory environment than has been heretofore possible.

Figure 4:
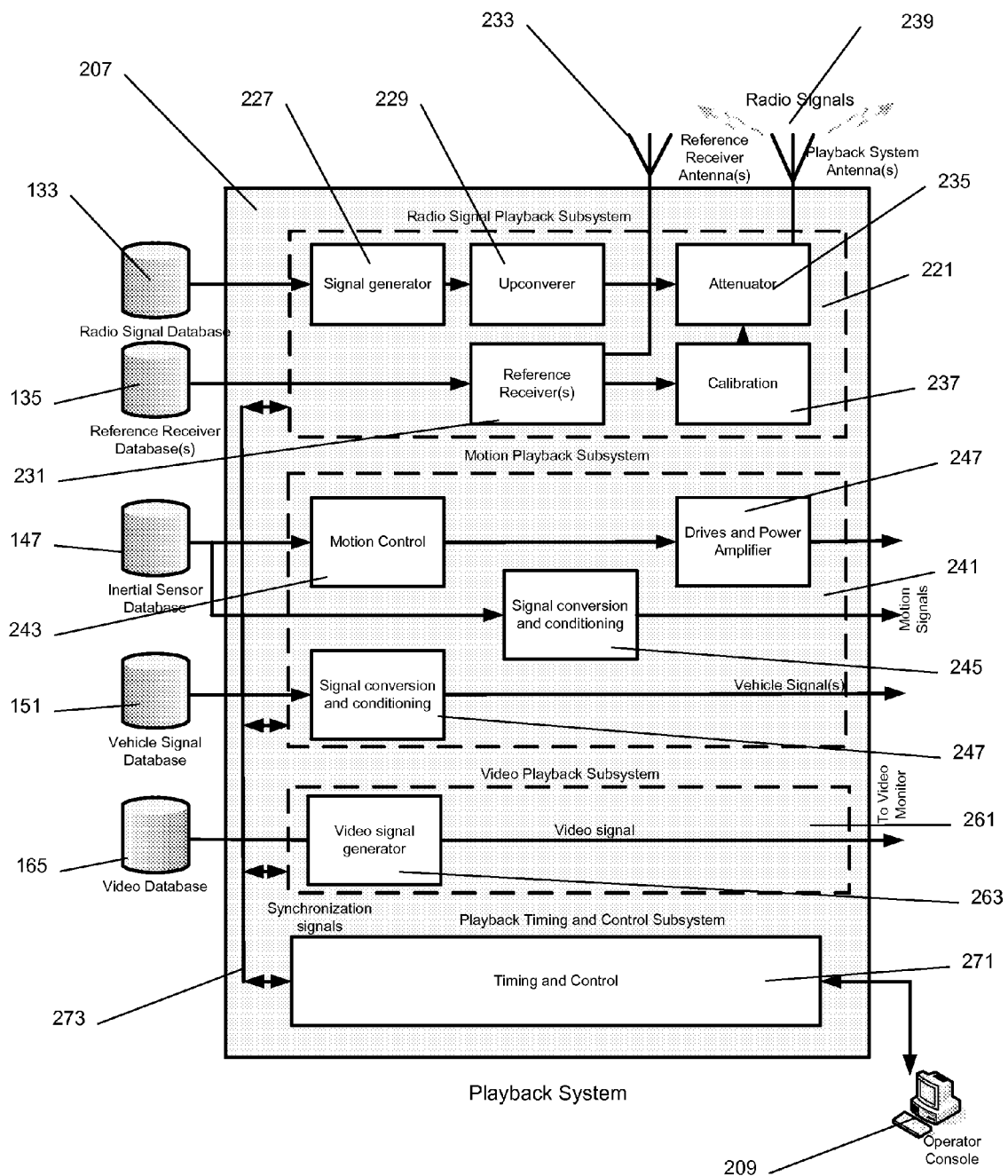
FIG. 4 illustrates a schematic diagram of the playback system in an exemplary embodiment of the present invention.

FIG. 4 shows the Playback Subsystem (207). In an exemplary embodiment, it may contain a Radio Signal Playback Subsystem (221) that uses playback various radio signals needed for a test, the radio signals consisting of a combination of GNSS broadcast signals and possibly other signals (such as GNSS augmentation signals, FM/RDS, XM, DAB, etc.). This information is stored in time-and location-specific data records (133) by the Recording System (101). In an exemplary embodiment, the radio signals are rebroadcast to the DUT through one or more playback antennas. In another exemplary embodiment, the signals are fed directly to the DUT via a coaxial cable, or similar. As a result, the DUT experiences the signals (through its built-in sensors/receivers) as if it were traveling through the designated location at the designated time.

The Radio Signal Playback Subsystem (221) is configured by software as to the power level of the generated radio signal and other parameters. In an exemplary embodiment the Signal Playback Subsystem (221) incorporates a signal generator (227) and an upconvertor (229) such as the PXIe-5672 2.7 GHz Vector Signal Generator from National Instruments, which incorporates a quadrature digital upconvertor. This device can accurately recreate a radio signal from the digital samples recorded by the Recording System (101). The signal generator component of this instrument first recreates the modulated radio signal at a certain intermediate frequency. This intermediate signal is then "upconverted" or "frequency shifted", by the digital upconverter component of the instrument, to the higher carrier frequency of the original radio signal recorded by the Recording System, while preserving the information in the modulated signal.

In an exemplary embodiment the signal power level can be adjusted to accurately reproduce the power level of the original signal recorded by the Recording System. This is accomplished by using amplifiers or attenuators (235), which are incorporated in the PXIe-5672 2.7 GHz Vector Signal Generator. The information recorded by one or more reference receivers (131) on the Radio Signal Recording Subsystem (121) is used to properly calibrate the signal power level to the precise level detected at the time of recording. The calibration process begins by accessing the data recorded by the reference receiver (131) on the Recording System and extracting the carrier-to-noise ratio (C/N ratio). This C/N ratio is compared to the C/N ratio extracted from the reference receivers (231) in the Playback System, which is being subjected to the RF signal received by one or more antennas (233) and generated by the Radio Signal Playback Subsystem (221). The signal power level for the signal produced by the Playback System is adjusted by the calibration module 237 such that average C/N ratio for the reference receiver data is the same as the average C/N ratio retrieved from the recorded data.

In another embodiment a second method of calibration is used which is independent of, and used as a check of the calibration performed with a reference receiver. When recording the radio signal, the power of the signal within the bandwidth of interest is calculated and recorded. For example, when dealing with GPS signals, this power-in-band is measured at 1575.42 MHz across 2.046 MHz. On playback, the power-in-band is again measured and the playback attenuators and amplifiers are then adjusted until the power-in-band seen on the recorder is the same as that found during the recording process.

In an exemplary embodiment the Radio Signal Playback Subsystem (221) can broadcast the radio signal through frequency-range-specific antennas (239). In another embodiment the radio signal can be fed to the external antenna input on the DUT (if available) through a special cable.

Referring back to FIG. 4, in one embodiment, synchronized motion information is stored in associated in time- and location-specific data records (147) by the Recording System. Motion signals can be used to drive motion control hardware such as rate tables. For example, yaw rate information can be used to drive a rotary stage or rate table. A DUT placed on such a rate table subjected to these motion information signals can be made to experience the same motion as the MRS at the time of recording. In one embodiment motion control software (243) can take recorded digital yaw rate signals and generate motion signals suitable for driving a rate table. These signals may first be amplified by a power amplifier (247) used for driving rate tables, such as the Aerotech SOLOISTCP10-MXU digital drive. This device can be used to drive a high-precision rate table such as the Aerotech ALAR-150 large aperture direct-drive rotary stage.

It is important to ensure that the resolution of the recorded data and ability of the rate table to generate distinct angular velocities betters the resolution of the DUT to detect this difference in motion. If this is not the case then slow and subtle changes in direction will be missed. The majority of commercial motion control systems are primarily concerned with positional accuracy and less concerned with exactly how the stage attained a final position. The playback of vehicle motion has no concept of final position and is concerned primarily with reproducing varying degrees of angular velocity. To achieve sufficient accuracy the resolution of both the signal sent to the power amplifier and that of the motor feedback must be taken into consideration. In addition, this closed-loop control must be fast and responsive. Given these requirements, a purely software solution on a general purpose processor is unlikely to work well. In an exemplary embodiment an FPGA host running a PID or similar closed-loop algorithm such as the NI PXI-7830R is a possible solution to this problem.

In another embodiment, the motion information signals could be fed directly to the DUT via Signal Conversion and Conditioning Module 245. In the case of linear acceleration for example, the acceleration signal can be use to replace the signal generated by an accelerometer on the DUT. In this case, the recorded digital acceleration signal will first be converted to an analogue signal and then conditioned to produce the precise signal that the DUT expects.

Recorded vehicle signal information (151) can be similarly converted from digital to analogue and appropriately conditioned for use by the DUT via Signal Conversion and Conditioning Module (247). For example, recorded speed information can be used to recreate the real-world conditions inputs for the Navigation System's VSS or CAN bus interface (if it is so equipped). Similarly vehicle reverse and brake signals can be provided to the DUT.

The motion signals are played back in synchronization with other signals and data captured in the same space and time.

Referring back to FIG. 4, in an exemplary embodiment, the Playback System can contain a Video Playback Subsystem (261). The video data may be read from the Video Database (165) and played back via the Video signal generator (263) that could utilize one or more video monitors to produce the view of the environment as the MRS travels through the locations in which the signal data was captured. In the case where the MRS is carried in a vehicle for example, the Video Playback Subsystem can be used to reproduce the view of the roadway seen by the occupants of the vehicle as the signal data was captured. The video images produced in this manner are replayed for synchronized observation by a test technician while laboratory testing a DUT that is processing the other signals and data captured in the same space and time.

Referring to FIG. 4, in an exemplary embodiment, the Playback System can be controlled via a Playback Timing and Control Subsystem (271). It is responsible for communicating with the external operator console (209), which is used by the operator to control the system. User settings and controls are conveyed by the timing and control subsystem to the respective subsystem via internal communication interface (273). The Playback Timing and Control Subsystem also controls the synchronization of the playback by the individual playback subsystems so all of the signals are be played back to a DUT in the same space and time.

Figure 5:
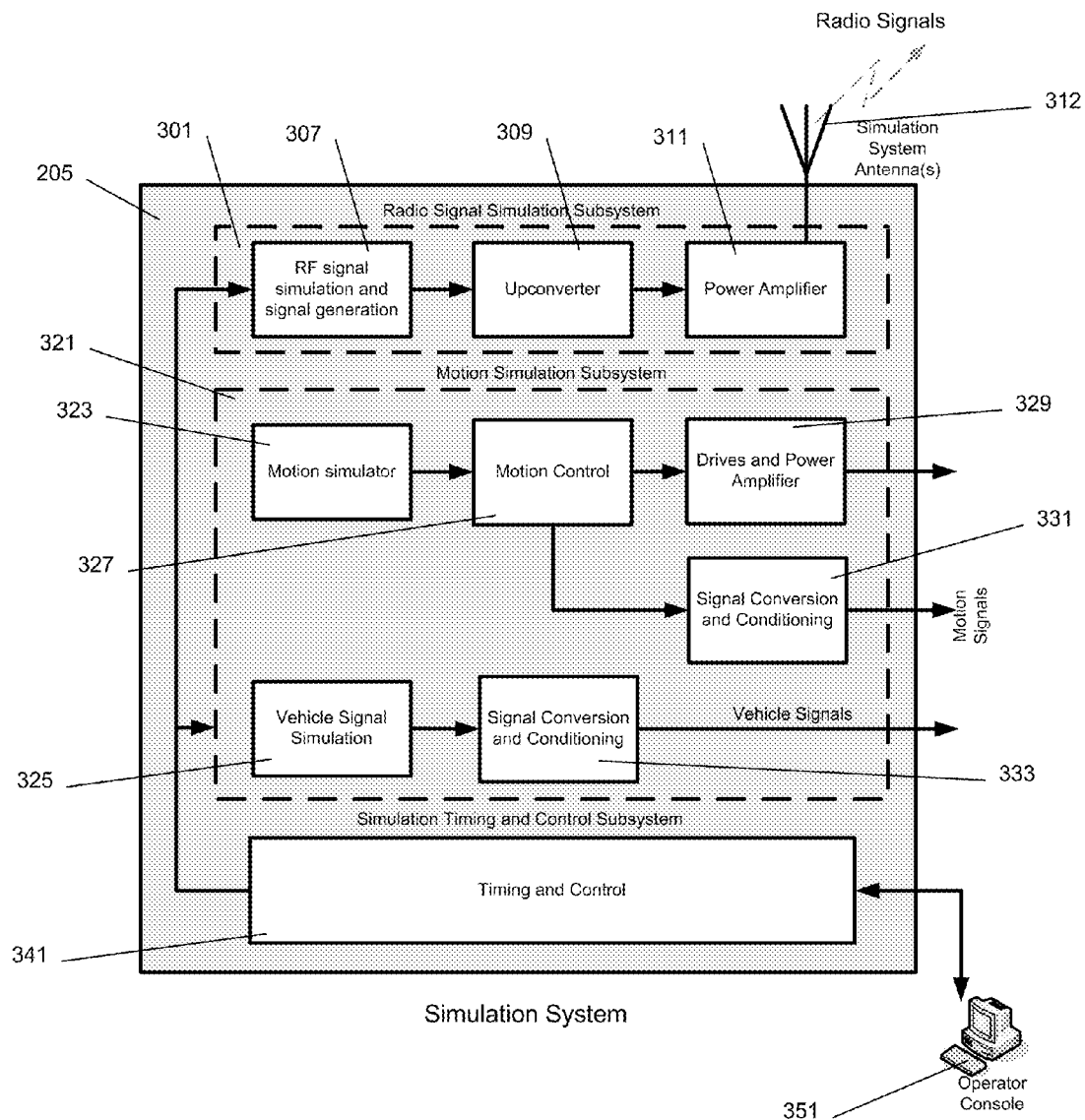
FIG. 5 illustrates a schematic diagram of the simulation system in an exemplary embodiment of the present invention.

In one embodiment of the invention, shown on FIG. 5, a Simulation System (205) can be added to the Playback System (201). For some test cases, it is preferable to simulate real-world conditions rather than to recreate them from captured and recorded signals and data. The Simulation System produces simulated RF and motion signals using specialized equipment and software. This simulation approach to GNSS broadcasting is particularly useful in testing the broad range of conditions that a navigation unit's sensor processing module will encounter in the real-world. There are signal conditions that are difficult to record in the field because such conditions are either dangerous or only rarely occur; therefore, it is more practical to simulate these signals for testing. For example, it is useful to test the behavior of a Navigation System for cases where a vehicle goes off public roadways or proceeds the wrong way on a road. Such conditions would be clearly dangerous to record in the field. In the case of a vehicle traveling the wrong way on a roadway, such a case could actually be a proper course under rare conditions. For example, when a city is being evacuated due to a natural disaster such as a hurricane or flood, it is common for public authorities to open both sides of a highway to accommodate the large number of vehicles exiting the city. Under such a scenario the Navigation System should recognize that traveling on the wrong side of a highway is not in error. To test such a scenario, simulated GPS RF signals can be generated which would model those GPS RF signals that a Navigation System might experience under these conditions. Simulated traffic signal information could also be generated such that the Navigation System experiences traffic information that corresponds to this situation.

As discussed earlier, the radio signals needed for a test consist of a combination of GNSS broadcast signals and possibly other signals (such as FM/RDS, XM, DAB, etc.). These radio signals can be simulated and broadcast, or otherwise fed to the DUT, such that the DUT experiences the signals (through its built-in sensors/receivers) as if it were traveling through the designated time and location scenario that the simulation is attempting to create.

Referring to FIG. 5, in one embodiment, the Simulation System (205) can have a Radio Signal Simulation Subsystem (301) that could utilize much of the same custom-configured hardware used by the Radio Signal Playback System (221) described earlier.

This is accomplished by using amplifiers or attenuators (235), which are incorporated in the PXIe-5672 2.7 GHz Vector Signal Generator.

This hardware can be programmed to produce radio signals simulating a particular scenario that the tester wishes to create. For example, it is possible through software algorithms which drive the hardware to produce the RF signals that would be received from a subset of a constellation of GPS satellites by a GPS receiver at a particular time and place on the earth. Using these algorithms, it is possible to configure the RF signals produced by the hardware to simulate the RF reception conditions of a GPS receiver at any arbitrary location and time and while moving on a path at certain times and speeds. It is also possible to simulate certain adverse reception conditions such as multi-path conditions, signal loss, and signal fading. In this way, one can create arbitrary testing scenarios without having to record signal data ahead of time. The playback approach still has the significant advantage of capturing the exact signal conditions (within certain limitations) the MRS experienced while recording. For example, GPS RF signal data gathered in the field includes distortions and errors due to the travel of the signal from a satellite to the GPS receiver antenna. The signal is prone to distortions and errors particularly in large cities with tall buildings where a signal may reflect or bounce off several structures before reaching the vehicles (i.e., multipath). Such distortions and errors are valuable because they are truly representative of a signal encountered in the field by a navigation system. GPS data simulated by mathematical algorithms may not include the precise distortions and errors experienced by a navigation system in a particular time and place, and may produce misleading results if used for testing navigation units. Thus, the Simulation System can never be guaranteed to precisely recreate the signal conditions for a given location and time, but can be very useful for creating arbitrary conditions.

Many Navigation Systems today are equipped with an FM radio receiver which incorporates Radio Data System (RDS) capabilities. RDS allows data to be transmitted with the typical audio information signal modulating the FM carrier. This is used by real time traffic information providers to transmit information about traffic conditions in the region the FM transmitter serves. In one embodiment, the Radio Signal Simulation Subsystem (301) can be used to create similar RF reception conditions that a terrestrial Navigation System's FM-RDS receiver would experience under typical use. Using both the GPS and FM-RDS simulation capabilities of the Radio Signal Simulation Subsystem in tandem, it is possible to create the FM-RDS RF signal conditions for any imagined traffic scenario, for a given geographical region, and to also create the GPS RF Signal conditions that approximate those a GPS receiver might experience at someplace and sometime within that same geographical region and within the imagined traffic scenario one is creating. This powerful tool can be used to simulate the response of a DUT as it travels a road network experiencing certain traffic conditions. It is very difficult to perform this test "live" by manually driving the road network, or by recording and playing back the traffic RF signals, since live traffic events are entirely out of tester's control.

Some Navigation Systems are equipped with satellite radio receivers of one kind or another, e.g., Sirius Satellite Radio. These receivers can also be used to receive traffic broadcasts. In one embodiment, the Radio Signal Simulation Subsystem can also be used to simulate these satellite signals.

The Radio Signal Subsystem can broadcast these radio signal through frequency-range-specific antennas (312) or the radio signal can be fed to the external antenna input on the DUT (if available) through a special cable.

Referring to FIG. 5, in one exemplary embodiment, the Simulation System (205) can contain a Motion Simulation Subsystem (321). Motion, synchronized with simulated GNSS signals, can be programmatically generated by the Motion Simulation Subsystem (321) using much of the same custom-configured hardware used by the Motion Playback System (241) described earlier. This motion information can be used to drive motion control hardware (via modules 327 and 329) such as rate tables or fed directly into the DUT (via modules 327 and 331). The Motion Playback System simulates motion signals such that the DUT experiences these signals (through its built-in motion sensors) as if it were traveling through the designated time and location scenario that the simulation is attempting to create. These motion signals will generally be created synchronously, from a time and location perspective, with simulated GNSS RF radio signals, and possibly with simulated FM-RDS or satellite radio signals.

Similarly vehicle signal information can be simulated (via module 325) and appropriately conditioned (via module 333) for use by the DUT. For example, vehicle speed information can be simulated and conditioned to drive the inputs for the Navigation System's VSS or CAN bus interface (if it is so equipped). Vehicle reverse and brake signals can also be provided to the DUT. These vehicle signals will be created synchronously, from a time and location perspective, with simulated GNSS RF radio signals, motion signals and possibly FM-RDS or satellite radio signals.

Referring back to FIG. 5, in one embodiment of the invention, the Simulation System (205) can have a Simulation Timing and Control Subsystem (341) that is responsible for communicating with the external operator console (351), which is used by the operator to control the system. User settings and controls are conveyed by the timing and control subsystem to the respective subsystem. The Simulation Timing and Control Subsystem also controls the synchronization of the simulated signals by the individual simulation subsystems so all of the signals are be played back to a DUT in the same space and time.

In one exemplary embodiment, a testing methodology is used where a database of test cases is created. Each test case describes the conditions necessary to test a different aspect of the functionality of the navigation system and the desired results of such a test. For each test case, one or more test locations is identified and stored in another database. These test locations are specific geographical locations where the test case can be executed. The Recording System can be taken to each test location and RF, video, inertial, and other such signal data and information collected and recorded to a database for future use. Once the data is stored in a database, it may be retrieved on demand and provided to the Playback System to generate signals to which a DUT can be subjected. In this way, the performance and behavior of a DUT can be determined under real-world-like conditions. Such testing may be conducted in any location, such as a test laboratory. The laboratory environment may include an RF anechoic chamber. The chamber may be further shielded from other natural environmental signals, such as geo-magnetic signals, and may be temperature controlled. The DUT and RF antenna(s) from the Playback and Simulation System may be positioned in the anechoic chamber. Such a chamber shields the tested unit from stray RF signals that are not part of the laboratory test. It may also prevent signals from the Playback and Simulation system from interfering with other systems, including other playback and simulation systems that may be in use nearby.

When drive testing a Navigation System, the precise behavior of the system will depending on the precise locations of the system antennas and the location and time where the test was performed. When performing subsequent testing, it will never be possible to exactly replicate these conditions, since at a minimum; the time that the test was conducted will be different. It may also be difficult or impossible to ensure the same antenna position and test drive locations are used on subsequent test runs. The Recording and Playback Systems help minimize this problem. The same recorded data can be used by the Playback system on each subsequent test, ensuring that the DUT is operating under identical circumstances. It may be helpful or even necessary to record data at different times of the day, or have antennas located on different parts of the vehicle in which the Recording System is installed, to test a DUT under different situations. For example, it may be useful to record signal data for a given test location with the GPS antenna located on the vehicle dash in the location where a PND would usually be located, and either simultaneously, or at a later point, record signal data with the GPS antenna located on top of the vehicle in the location where a preinstalled vehicle navigation systems GPS antenna would usually be located. The appropriate signal file would then be used for testing a PND or a preinstalled vehicle navigation system.

As a DUT is subjected to the signals produced by the Playback and Simulation System, the behavior and performance of the DUT may be monitored and evaluated. For example, functions such as turn-by-turn route guidance to specific destinations may be monitored to determine if the navigation unit is providing reasonable guidance instructions. In one exemplary embodiment, this monitoring and evaluation may be performed by a test technician. In another exemplary embodiment, this monitoring and evaluation can be performed by automated software and hardware. If errors are detected in the performance of the DUT, these errors may be addressed by software or hardware corrections and the DUT may be tested again. This allows for a rapid interactive process which can eliminate a substantial amount of the cost and time needed to test a DUT.

Detailed information on the behavior and performance of the DUT may be captured in a software system which is capable of producing automated, semi-automated, or customized reports on the performance and behavior of the DUT. The reports may include standard statistical data, graphs, charts, and the like. Reports may also be customized based on the operator's knowledge and skill for analyzing test data. The reports may be in the form of printouts, computer files, or any method that allows for the understanding of the analysis of the laboratory test. Alternatively a technician may manually generate reports based on observation of a navigation unit during testing. Or results may even be noted in a lab notebook or verbally relayed to a development team charged with resolving errors in the navigation unit performance.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

The invention claimed is:

1. A testing system adapted to evaluate navigation systems, the testing system comprising:
    a recording system adapted to collect and record signals received and interpreted by a navigation system during field operation;
    a time-synchronized database adapted to receive and store data representing the signals collected and recorded by the recording system;
    wherein the stored data is able to be used to test operation of one or more navigation systems under test.

2. The testing system of claim 1, wherein the recording system comprises an environmental signal recording subsystem adapted to gather environmental signals that would be received and interpreted by a navigation system during field operation, and store the environmental signals in the time-synchronized database.

3. The testing system of claim 2, wherein the environmental signals include radio frequency signals, comprising output signals from reference radio receivers.

4. The testing system of claim 2, wherein the recording system further comprises:
    a motion signal recording subsystem adapted to gather signals related to motion that would be received and interpreted by a navigation system during field operation, and store the signals related to motion in the time-synchronized database;
    a video recording subsystem adapted to capture one or more video images of the field environment during testing, and store the captured video images in the time-synchronized database; and
    a recording time and control subsystem adapted to communicate with an external operator console.

5. The testing system of claim 4, wherein the signals related to motion include inertia signals.

6. The testing system of claim 1, further comprising a playback system adapted to use the stored data from the time-synchronized database to recreate field operation conditions for the one or more navigation systems under test.

7. The testing system of claim 6, wherein the playback system comprises an environmental signal playback subsystem adapted to provide stored environmental signals from the time-synchronized database to the one or more navigation systems under test.

8. The testing system of claim 7, wherein the stored environmental signals include radio frequency signals, comprising output signals from reference radio receivers.

9. The testing system of claim 7, wherein the playback system further comprises:
 a motion signal playback subsystem adapted to provide stored signals related to motion from the time-synchronized database to the one or more navigation systems under test;
 a video playback subsystem adapted to play back stored video data from the time-synchronized database to the one or more navigation systems under test;
 a playback timing and control subsystem adapted to communicate with an external operator console.

10. The testing system of claim 9, wherein the signals related to motion include inertia signals.

11. The testing system of claim 6, further comprising a simulation system adapted to produce and provide simulated field operation conditions to the one or more navigation systems under test.

12. The testing system of claim 11, wherein stored simulation signals include environmental signals that would be received and interpreted by a navigation system during field operation.

13. The testing system of claim 12, wherein the environmental signals include radio frequency signals, comprising output signals from reference radio receivers.

14. The testing system of claim 12, wherein the stored simulation signals further include signals related to motion that would be received and interpreted by a navigation system during field operation.

15. The testing system of claim 14, wherein the signals related to motion include inertia signals.

16. A method of testing navigation systems, the method comprising:
 gathering data that would be received and interpreted by a navigation system during field operation, wherein the gathered data includes data associated with received radio signals;
 storing gathered data in a time-synchronized database; and
 using the stored data to test the operation of one or more navigation systems.

17. A system adapted to test navigation systems, the system comprising:
 a recording system adapted to gather radio frequency signals and motion signals in the field that would be received and interpreted by a navigation system during field operation, and store the signals in a time-synchronized database;
 a playback system adapted to provide the stored signals to a navigation system under test to recreate conditions experienced by a navigation system during field operation; and
 a simulation system adapted to provide simulated signals to the navigation system under test, wherein the simulated signals are signals that a navigation system would receive and interpret during field operation.

18. The system of claim 17, wherein the recording system is further adapted to record output signals from reference radio receivers.

19. The system of claim 17, wherein the recording system further comprises:
 an environmental signal recording subsystem adapted to gather environmental signals that would be received and interpreted by a navigation system during field operation; and
 a motion signal recording subsystem adapted to gather motion signals that would be received and interpreted by a navigation system during field operation.

20. The system of claim 19, wherein the motion signals include inertia signals.

* * * * *